6 Sheets—Sheet 1.
C. F. DIETERICH.
Gas Making Apparatus.
No. 234,546. Patented Nov. 16, 1880.
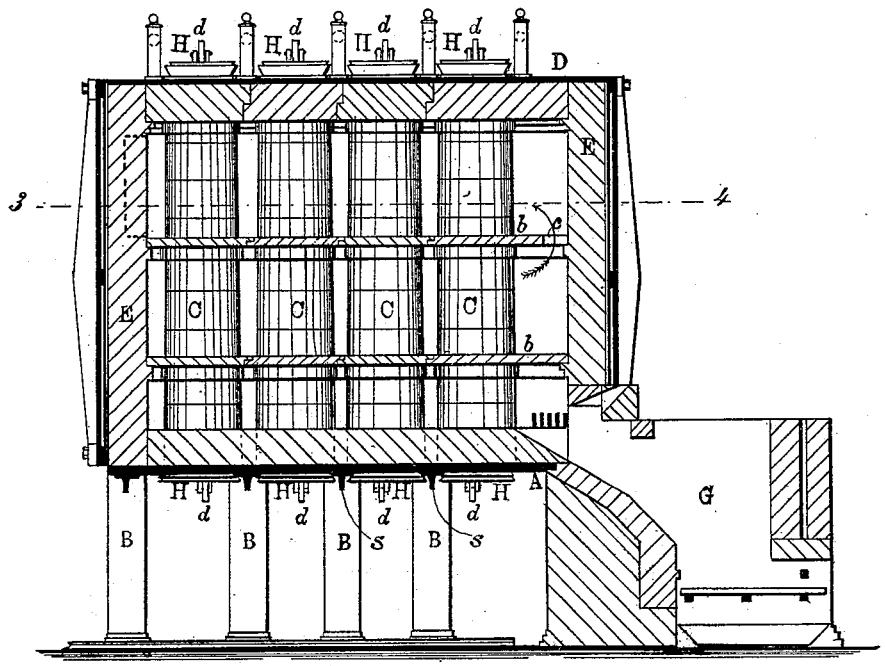
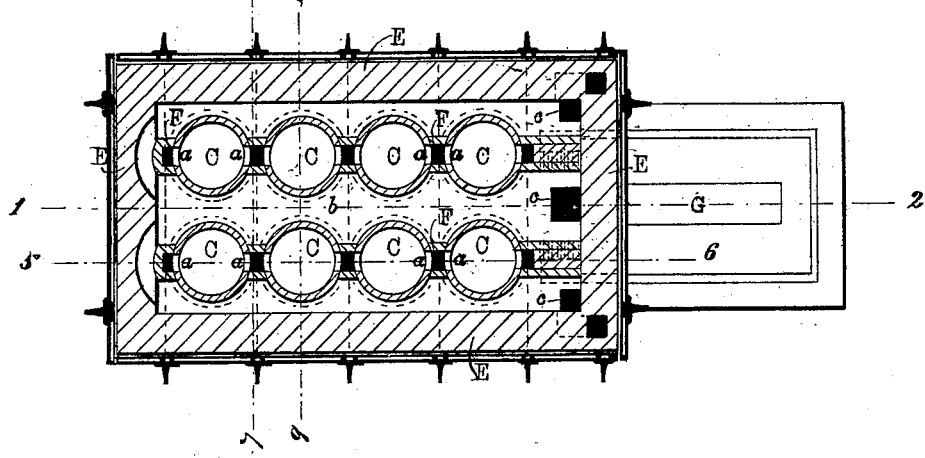
WITNESSES.
Geo. A. Boyden.
Harry V. Albaugh.
INVENTOR.
Charles F. Dieterich,
by G. H. & W. T. Howard
attys.

C. F. DIETERICH.
Gas Making Apparatus.
No. 234,546. Patented Nov. 16, 1880.
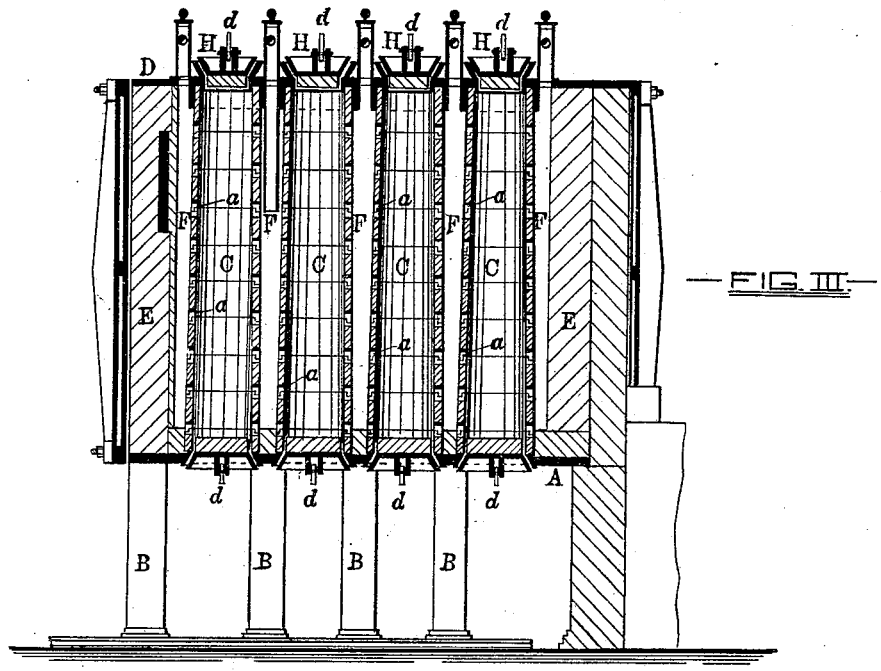
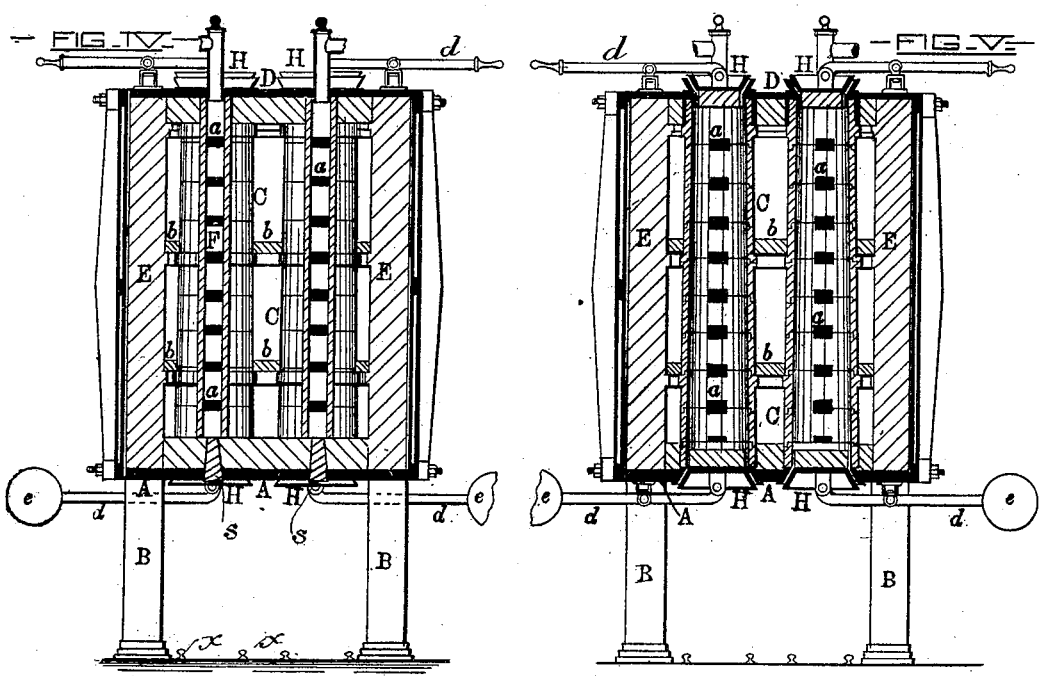

6 Sheets—Sheet 3.
C. F. DIETERICH.
Gas Making Apparatus.
No. 234,546. Patented Nov. 16, 1880.
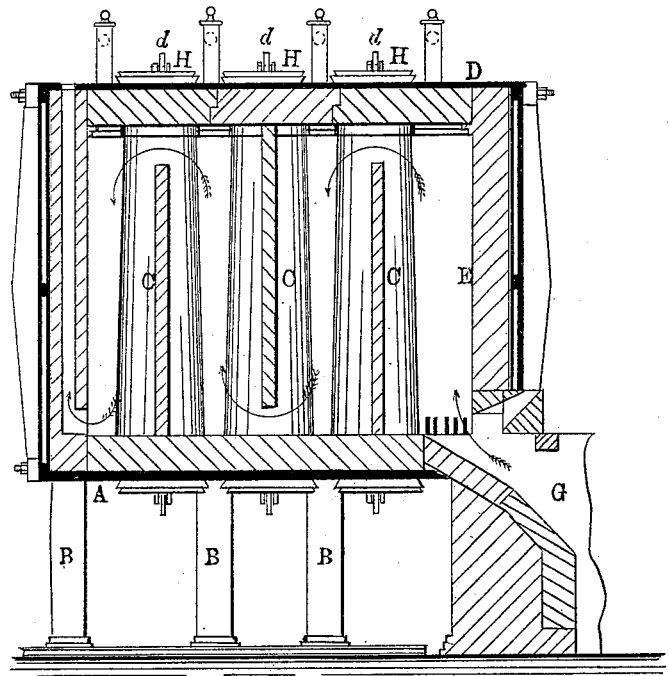
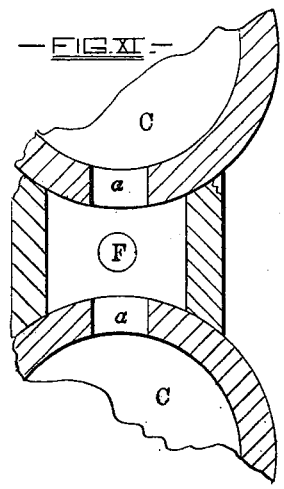
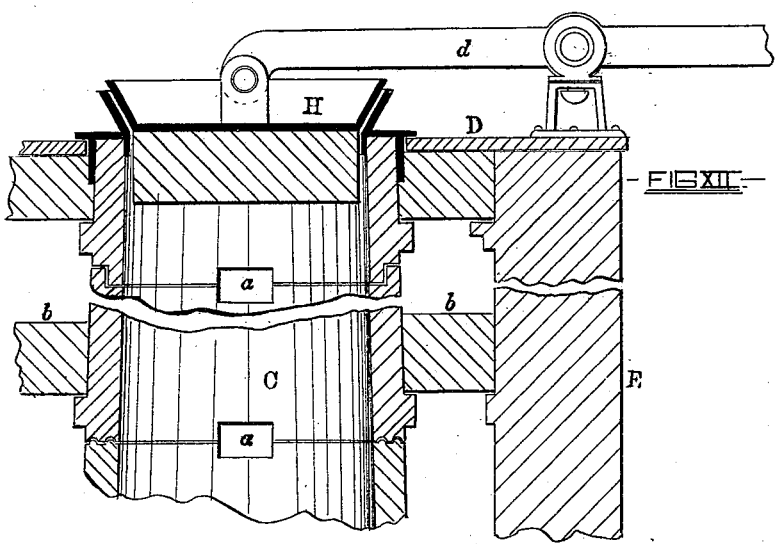
WITNESSES: Geo. A. Boydew, Harry V. Albaugh
INVENTOR: Charles F. Dieterich, by G. H. W. T. Howard, atty.
N. PETERS, PHOTO-LITHOGRAPHER, WASHINGTON, D.C.

C. F. DIETERICH.
Gas Making Apparatus.
No. 234,546.     Patented Nov. 16, 1880.
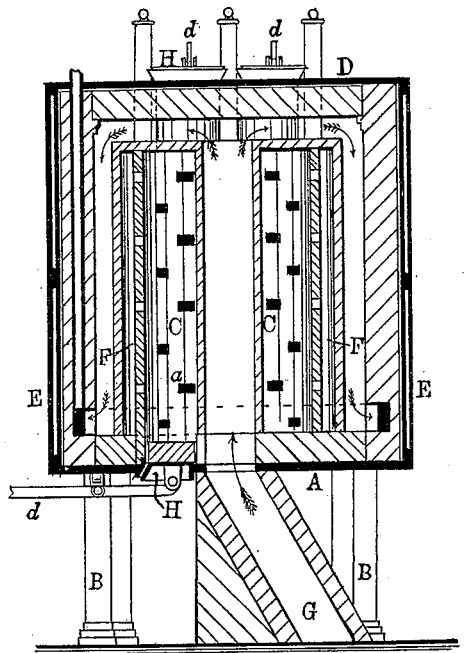
FIG. VI.
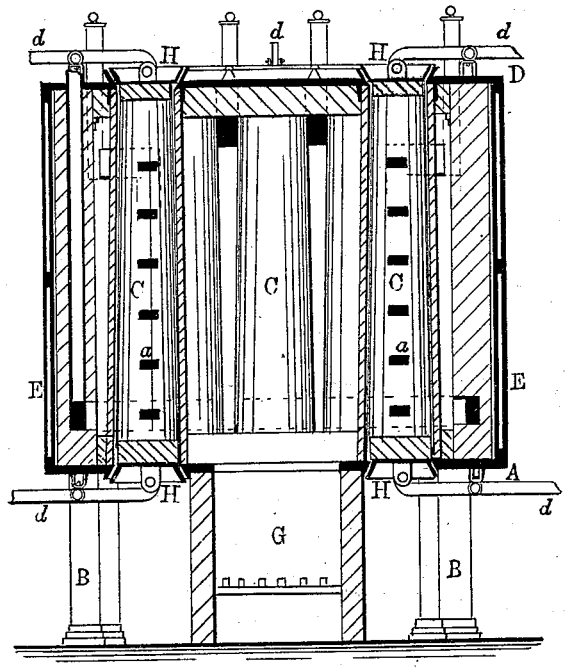
FIG. VIII.
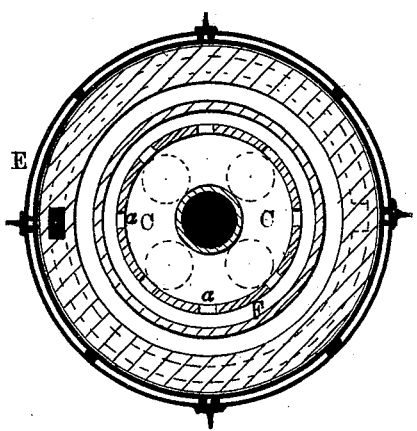
FIG. VII.
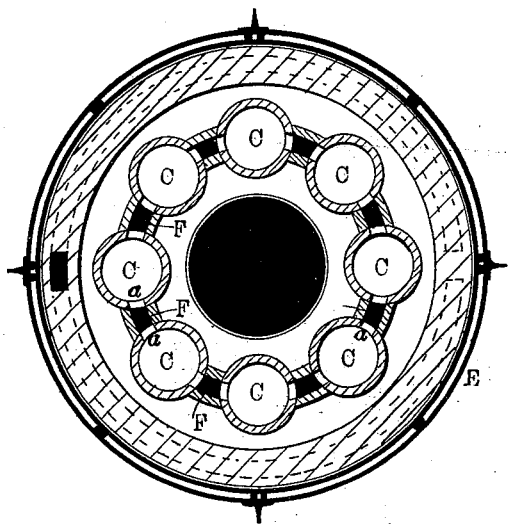
FIG. IX.
WITNESSES
Geo. A. Boyden
Harry V. Albaugh
INVENTOR
Charles F. Dieterich,
by G. H. W. T. Ward
atty C. F. DIETERICH.
Gas Making Apparatus.
No. 234,546.  Patented Nov. 16, 1880.
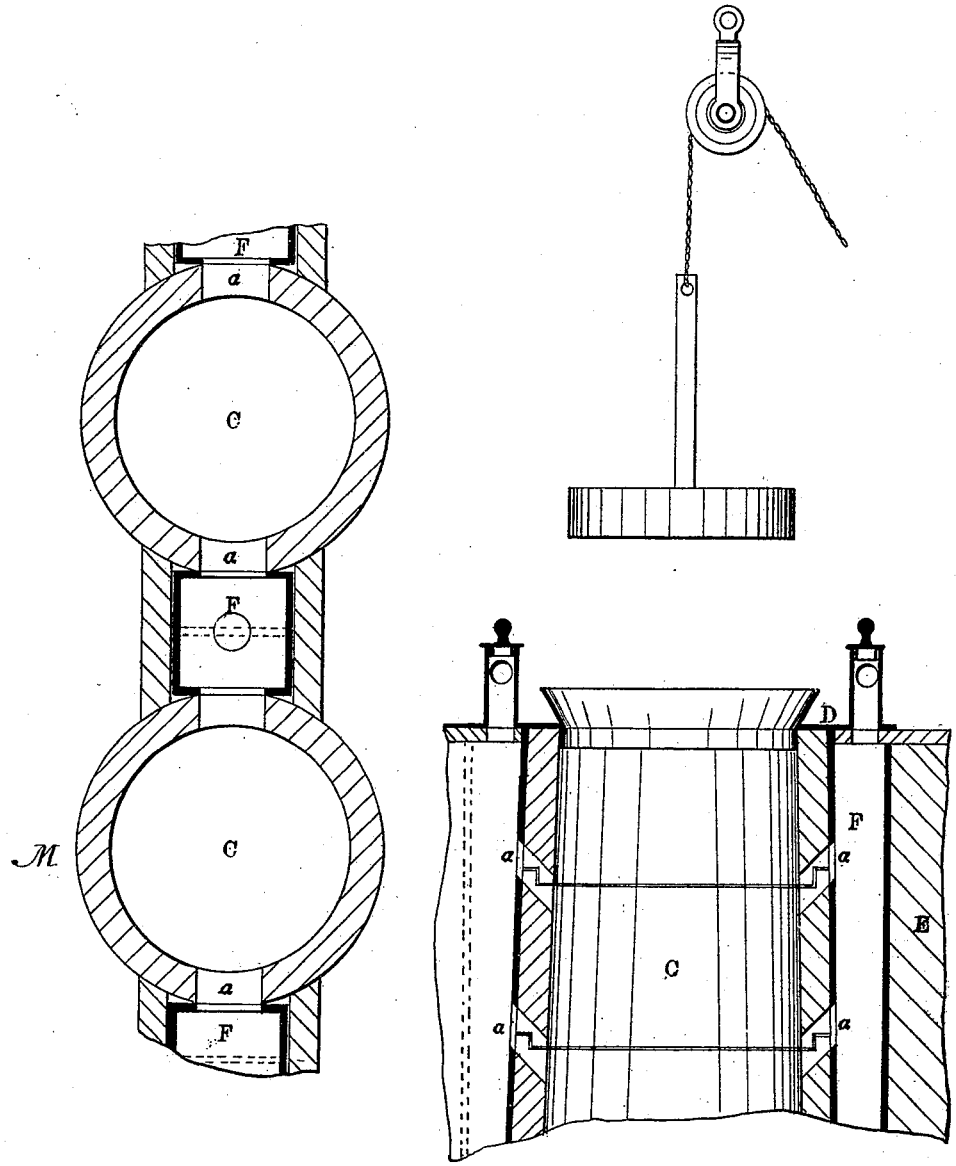
— FIG. XV. —  — FIG. XVI. —
— WITNESSES — — INVENTOR —

C. F. DIETERICH.
Gas Making Apparatus.
No. 234,546. Patented Nov. 16, 1880.
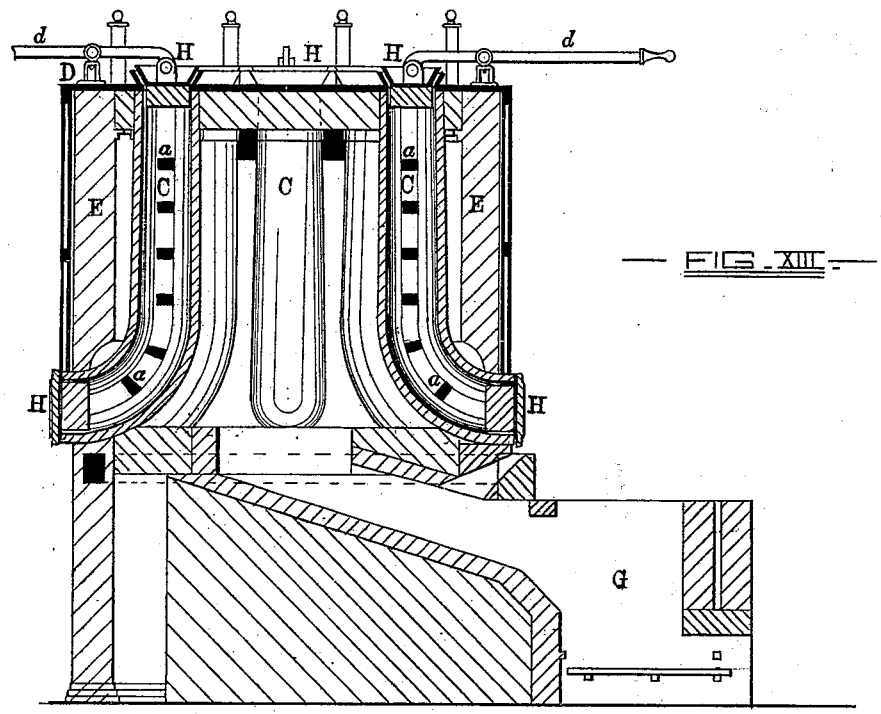
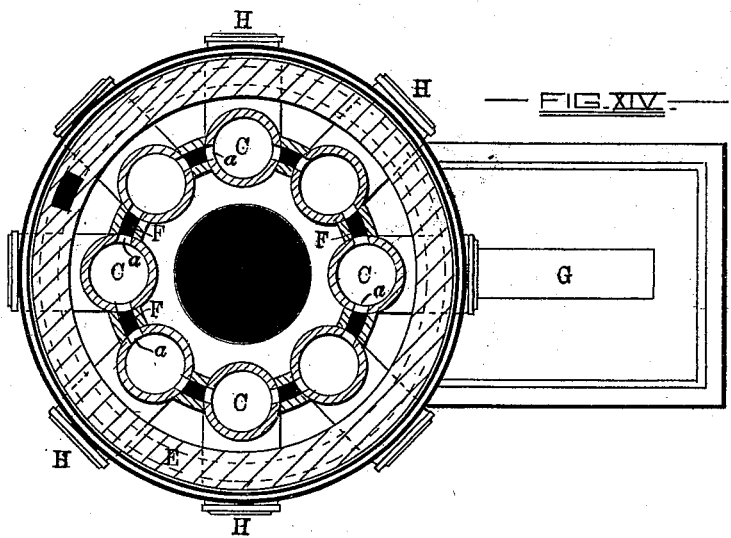
WITNESSES
Geo. A. Boyden.
Harry W. Albaugh.
INVENTOR
Charles F. Dieterich,
by G. H. W. J. Howard
attys.

UNITED STATES PATENT OFFICE.

CHARLES F. DIETERICH, OF BALTIMORE, MARYLAND.

GAS-MAKING APPARATUS.

SPECIFICATION forming part of Letters Patent No. 234,546, dated November 16, 1880.

Application filed December 12, 1879.

*To all whom it may concern:*

Be it known that I, CHARLES F. DIETERICH, of the city of Baltimore and State of Maryland, have invented certain Improvements in Gas-Making Apparatus, of which the following is a specification; and I do hereby declare that in the same is contained a full, clear, and exact description of my said invention, reference being had to the accompanying drawings, and to the letters of reference marked thereon.

In carrying out my invention I employ a vertical gas-retort or series of retorts, made in horizontal sections, which form practically so many distilling-chambers with lateral openings at their joints, through which the gas produced in them respectively passes into a channel communicating with the stand-pipe without going necessarily through a heated mass above it. Suitably-hinged stoppers are provided at the top and bottom of the retorts, those at the top for charging with coal and those at the bottom for discharging the coke. The retort or series of retorts thus constructed are placed within a chamber having heat-retaining walls through which chamber the heat and products of combustion from a furnace make their way by circuitous passage to the chimney, the whole structure being supported on columns or piers high enough for barrows or trucks to pass under it to receive the coke when discharged from the retorts, and having a railway above it, from which the retorts may be charged. The same object may be accomplished by a single retort not divided into sections, but with suitable lateral openings in its length for the escape of the gas as produced to the channels.

The invention consists, first, in combining in a gas-making apparatus a vertical retort or series of retorts having lateral openings at different heights for the escape of gas, uniting with channels leading to the stand-pipes, and a heat-retaining chamber communicating with the furnace and divided by partitions into a series of sub-chambers, whereby the products of combustion are caused to take a circuitous passage around or about the retort or retorts to the chimney.

The invention consists, secondly, in constructing the retort in horizontal sections, the opposing edges of which are notched so as to form lateral openings in the retort when its various sections are placed in their relative positions.

In the further description of my said invention which follows reference is made to the accompanying drawings, forming a part hereof, and in which—

Figure I is a longitudinal section of the improved apparatus on the dotted line 1 2, Fig. II. Fig. II is a sectional plan on dotted line 3 4, Fig. I. Fig. III is a longitudinal section of the apparatus on dotted line 5 6, Fig. II. Figs. IV and V are transverse sections of the invention, taken respectively on dotted lines 7 8 and 9 10, Fig. II. Figs. VI, VII, VIII, and IX are sectional views of the apparatus, illustrating certain modifications in its construction. Fig. X shows further modifications in the arrangement of the several parts of the apparatus. Figs. XI and XII are views of parts of the apparatus on an enlarged scale. Figs. XIII and XIV show a different arrangement of the parts of the apparatus. Figs. XV and XVI are enlarged views of parts of the invention, showing further modifications in the construction of the same.

Similar letters of reference indicate similar parts in all the views.

Referring to Figs. I, II, III, IV, and V of the drawings, A is the base-plate of the apparatus, supported upon columns B at such distance from the ground as will admit of coke barrows or cars being taken under the retorts.

C C are the retorts, extending vertically from the base-plate A to a covering-plate, D. The retorts are placed in a chamber, the walls of which are represented by E, and the whole structure is tied together in any suitable manner. The retorts C are formed in horizontal sections, and the opposing faces of the sections are provided with projections and correspondingly-shaped recesses, so as to make gas-tight joints.

The lateral openings before alluded to, and which are represented by *a*, may be made in the retort in any suitable manner; but the preferred method is to notch the opposing ends of the sections and oppose the notches as the sections are placed in position.

F F are the channels into which the gases from the retorts find their way. The channels are constructed of brick-work, and may be lined with iron, as shown in Fig. XV of the drawings. When channels F are located between the retorts, a single channel may receive the gas from the retorts on either side of it; but a partition, as shown in dotted lines, Fig. XV, can, if desired, be used to isolate the retorts.

G is a heating-furnace of any appropriate description, adapted to discharge the products of combustion into the chamber and around the retorts. In order that the products of combustion from the heating-furnace may be properly distributed in the chamber, and to prevent loss from the direct passage of the said products to the chimney, I divide the heat-retaining chamber into a number of sub-chambers by horizontal partitions b, and provide each partition with an opening, c, for the entrance of the products of combustion from the furnace either directly or through one of the other chambers.

H H are the retort-stoppers, connected to hand-levers d, adapting them to be withdrawn from the retorts and moved from over or under the same in the charging and discharging operations. Weights E are used on the levers attached to the lower stoppers to counterbalance the contents of the retorts.

In the apparatus shown in Fig. VI and VII a single retort of annular form, provided with an outer annular gas-channel, is used, and the products of combustion from the heating-furnace are carried upward through the central aperture and return around the exterior of the gas-channel. The retort, however, is furnished with several charging and discharging openings, which have stoppers, as before described.

The apparatus is further modified in Figs. VIII and IX by arranging series of retorts around a central aperture leading to the heating-furnace and placing the gas-channels between the retorts. A similar arrangement is illustrated in Figs. XIII and XIV; but in this case the lower end of the retorts are curved outwardly.

In charging the retorts the upper stoppers are removed and the retorts filled with coal, after which the said stoppers are replaced.

To discharge the retorts after the illuminating-gas has been expelled from the coal, it is only necessary to remove the lower stoppers, when the coke falls by reason of its weight to coke-barrows placed beneath them.

Should it be found in discharging the contents of the retorts that pieces of coke lodge in the lateral openings, the said openings may be inclined, as shown in Fig XVI of the drawings; and in case of adhesion of coke to the surface of the retorts I propose to provide them with plungers similar to the one shown in the same figure, which may be lowered into the retorts to remove the adhering pieces.

In this invention I do not limit myself to the use of a heating-furnace of any particular construction, or to any peculiar manner of applying the heat necessary to effect the production of gas in the retorts, or to the use of a heating-furnace, as gas generated in the retorts or by another process distinct from the one described herein may be carried to the interior of casing and ignited therein. Further, I do not confine myself to any specific construction or arrangement of the partitions which divide the heat-retaining chamber into a series of communicating sub-chambers to which the products of combustion from the furnace are successively conducted in their passage to the chimney.

I am aware that it is not new to construct a vertical gas-retort with lateral openings situated at different heights for the escape of gas, and with means for carrying the gas from the lateral openings to a gas-receptacle, and that vertical retorts having lateral openings have been built in brick-work and heated by the action of the products of combustion from a furnace, which products of combustion are conducted into a space in the brick-work and deflected toward the exterior surface of the retort by means of interrupting-blocks.

I am also aware that in coke-ovens and analagous apparatus it is not new to construct a retort in sections.

I also admit that vertical retorts have been provided with stoppers and devices for operating them; but I am not aware of the existence prior to my invention of a retort or series of retorts having lateral openings at different heights arranged around the circumference of the retorts and channels to receive the gas discharged through the lateral openings, which channels convey the gas to a stand-pipe, the whole of the said apparatus being inclosed in a heat-retaining chamber having partitions therein which divide the said chamber into a series of sub-chambers and distribute the products of combustion conveyed to the said chamber from a furnace.

I claim as my invention—

1. In a gas-making apparatus, a vertical retort or series of retorts having lateral openings at different heights for the escape of gas therefrom, the said openings uniting with channels leading to the stand-pipes, in combination with and inclosed within a heat-retaining chamber in communication with a heating-furnace, which heat-retaining chamber is divided by partitions into communicating sub-chambers, which distribute the products of combustion in their passage from the furnace to the chimney around or about the retorts, substantially as herein specified.

2. A gas-retort constructed in horizontal sections having their opposing edges notched, forming lateral openings in the retort when its various sections are placed in their proper relative positions, substantially as set forth.

CHARLES F. DIETERICH.

Witnesses:
GEO. A. BOYDEN,
HARRY V. ALBAUGH.